United States Patent [19]

Bringol et al.

[11] 4,228,322
[45] Oct. 14, 1980

[54] DECREASING TIME DURATION OF RECORDED SPEECH

[75] Inventors: Charles R. Bringol, Austin; Gary F. Snyder, Round Rock, both of Tex.

[73] Assignee: International Business Machines Corporation, Armonk, N.Y.

[21] Appl. No.: 227

[22] Filed: Jan. 2, 1979

[51] Int. Cl.³ ............................................. G11B 5/02
[52] U.S. Cl. ....................................... 179/15.55 T
[58] Field of Search ............. 179/15.55 T, 1.5 A, 179/1.5 M, 1.5 H, 100.2 K

[56] References Cited

U.S. PATENT DOCUMENTS

| | | | |
|---|---|---|---|
| 3,104,284 | 9/1963 | French et al. | 179/15.55 T |
| 3,621,150 | 11/1971 | Pappas | 179/15.55 T |
| 3,786,195 | 1/1974 | Schiffman | 179/15.55 T |
| 3,803,363 | 4/1974 | Lee | 179/15.55 T |
| 3,816,664 | 6/1974 | Koch | 179/15.55 T |
| 3,872,503 | 3/1975 | Schutterly | 179/15.55 T |
| 3,934,094 | 1/1976 | Kobayashi et al. | 179/15.55 T |

*Primary Examiner*—Malcolm A. Morrison
*Assistant Examiner*—E. S. Kemeny
*Attorney, Agent, or Firm*—Andrea P. Bryant

[57] ABSTRACT

Disclosed is apparatus for and a method of decreasing the time duration of playback of recorded speech without distortion. Speech recorded at a normal rate is played back at a higher rate using two variable length buffers in alternating fashion to receive sampled speech segments. Threshold analysis logic circuitry is provided to continually compare the output voltage levels of both buffers and to switch the output between the buffers to a using device when the voltage level of both buffers is approximately zero and of an equal amplitude. In this way output to the using device consists of segments from both buffers joined with a minimum of generated noise and no associated dead zone without regard to any predetermined segment length.

9 Claims, 3 Drawing Figures

DECREASING TIME DURATION OF RECORDED SPEECH

DESCRIPTION

1. Field of the Invention

The instant invention relates to speech transmission. More particularly, it relates to time compressed playback of recorded speech.

2. Prior Art

It is known that speech can be comprehended at much faster than speaking rates without an accompanying fatigue factor if the audio quality is natural and free from noise and distortion. Several techniques, and apparatus for implementing them, are known in the prior art, which are directed to speeding up the playback of recorded speech signals.

U.S. Pat. No. 3,803,363 to Lee discloses apparatus for modifying the time duration of analog data including a storage device having a multiplicity of storage locations, means for storing input data in consecutive locations at a first rate, a means for transferring stored data samples from consecutive locations of the storage device at a second rate. The stored data is monitored for a particular amplitude and a positive to negative direction. A representation of data having such characteristics is stored. Transfer of the sequence of data from the storage device to the output is terminated and transfer of a new sequence is initiated as a function of the difference between the first and second rates and the stored data representation. The new sequence of data samples is initiated at a storage location that is spaced from the storage location from which the last data of the prior sequence was transferred. Segments of the input data are transferred from the storage device to output so that smooth transitions are provided between the outputted data sequences. Lee achieves this by monitoring the input and output data and terminating transfer from one section of storage when the particular amplitude and direction signal characteristic is found in both the input and output.

Kobayashi et al in U.S. Pat. No. 3,934,094 also uses a single memory device to receive input speech signals for reproduction at a rate other than the original. Control means for reading in and out operate to make the intervals an increased but fixed length so as to extend the period of the annoying click noises. No attempt is made to eliminate the annoying click noises when the output and input are switched.

In U.S. Pat. No. 3,621,150, Pappas utilizes a pair of shift register memories in alternating fashion to receive digitized voice signal input segments. Control means are provided for switching between the two registers for output when one register is fully loaded, thus giving fixed length output segments. The results from apparatus using principles of this invention are similar to that from other prior art devices already described in that no attempt is made to cure the problem of the annoying clicking which occurs when the transition between memories for output is actually made.

U.S. Pat. No. 3,816,664 to Koch discloses the use of two memories for separating the reading and writing functions in real time signal compression apparatus. Read or write roles of the memories are reversed under control of logic including the detection of when the counter associated with the memory in the write mode reaches its maximum effective count.

Thus, only one prior art technique, Lee, imposes any restriction on when speech segments are joined. Otherwise, segments are joined automatically without regard to speech content and based solely on fixed segment lengths, that is, preselected lengths or limited by the length of memory. Therefore the problem of segment joining noise continues in the prior art to greater and lesser degrees. The prior art techniques of speeded playback of recorded speech share the disadvantage of segment joining noise, which is annoying to the listener.

Accordingly, it is an object of the present invention to overcome the aforementioned shortcomings in the prior art of decreasing the time duration of recorded speech without accompanying noise and distortion.

It is a further object to provide time compressed playback of recorded speech and a more natural sound substantially free of segment joining noise.

It is another object of the present invention to join speech segments from a pair of buffers when output voltage signals from each buffer have essentially equal amplitude and are within a specific range, centered about zero, regardless of output segment lengths.

SUMMARY

These and other objects are achieved using the apparatus and method of the present invention. Recorded speech is sampled and temporarily stored in alternative fashion in a pair of dynamic storage devices. As will become clear from the following more particular description, these storage devices are in effect variable length buffers. Output to the using device is switched between the buffers when the voltage level of each is at or near zero and they are of equal amplitude. As a result, the speech output from the using device has a natural sound and substantially no objectionable noise because the switching logic of the instant invention monitors the output signals from each of the buffers and controls the switching to occur when the voltage output level of each buffer is in a range $\pm 100$ mv and the amplitudes are equal. The switch occurs regardless of the output segment length.

With the apparatus of the instant invention, the annoying noise inherent in prior art techniques is substantially eliminated because segment joining occurs at an optimum point. If this optimum point, hereinafter referred to as "quiet switching time", is not found; there is a default to maximum segment length equal to the length of the buffer being read out. That is, if the buffer supplying output to the using device becomes empty before the two conditions are met, the system of the present invention switches over to the other alternate buffer.

The foregoing and other objects, features and advantages of the invention will be apparent from the following more particular description of a preferred embodiment as illustrated in the accompanying drawing.

DESCRIPTION OF THE PREFERRED EMBODIMENT

Figure 1:
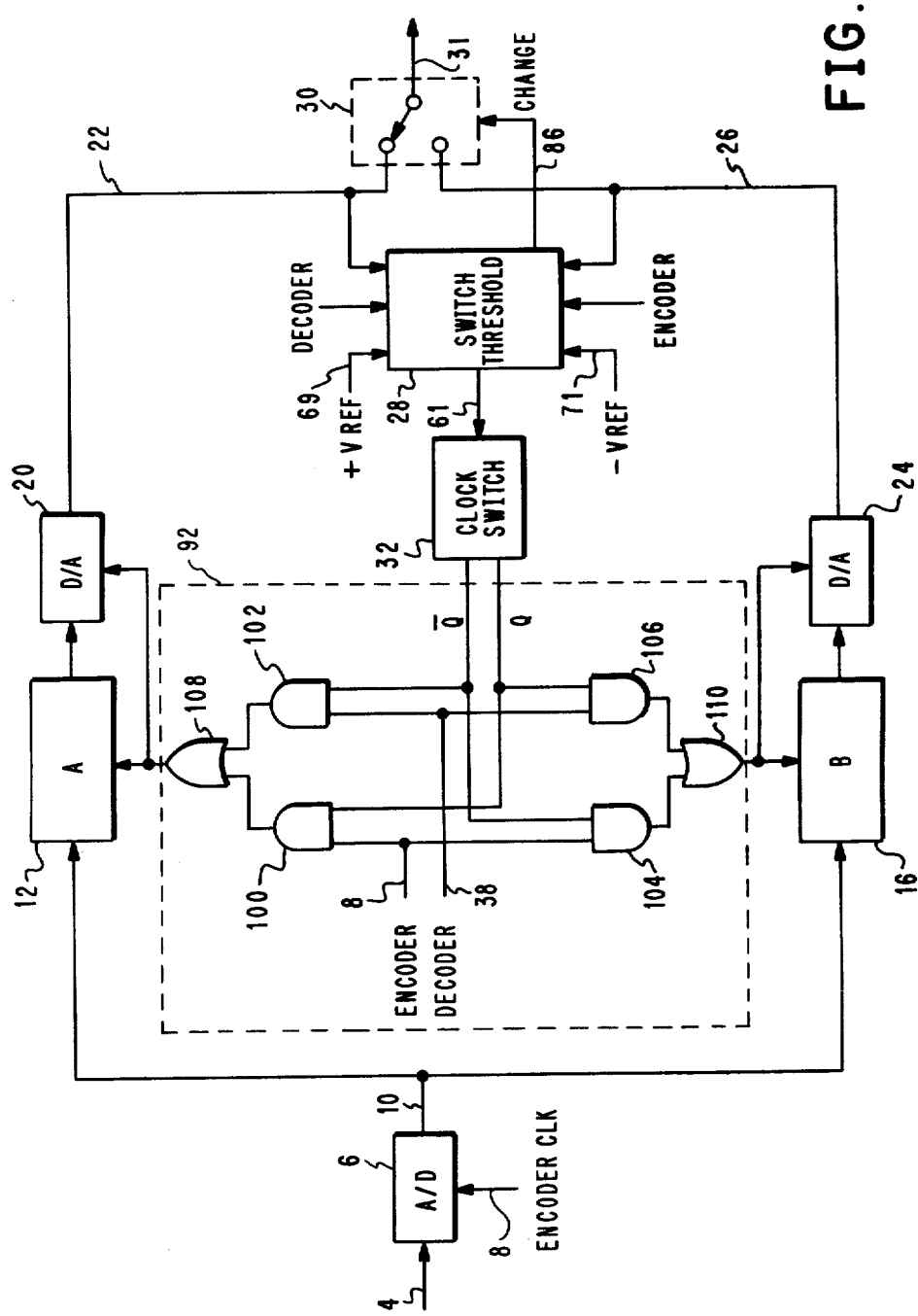
FIG. 1 is a block diagram of the apparatus of the invention for varying the playback rate of recorded speech.

Referring now to FIG. 1, the speech signal on line 4, from, for instance, a recorded magnetic tape or disc is input to analog to digital converter 6 which converts the speech signal from analog to digital representation. Pulses from an encoder clock applied to line 8 are used to clock the analog to digital converter 6 causing it to sample the signal on line 4. Digitized output on line 10 is read into one of the dynamic storage devices 12 and 16 under control of pulses from the encoder clock on line 8. Storage devices 12 and 16 are preferably dynamic shift registers but may be other type memory devices as is understood by those skilled in the art. For convenience in describing our invention, these devices will be referred to as buffers A and B. Storage devices 12 and 16 are connected to digital to analog converters 20 and 24, respectively which are preferably of the synchronous demodulation type. Analog output from digital to analog converters 20 and 24 is input along lines 22 and 26, respectively to switch threshold logic 28 which will be described in detail with reference to FIG. 2. The output on line 61 from switch threshold logic 28 is applied to clock switch toggle 32 for switching encoder and decoder clock pulses on lines 8 and 38, respectively from one to the other of dynamic storage devices 12 and 16. At the same time, switch threshold logic 28 effects a change of the output to the using device alternately as illustrated at switch block 30. The change register signal on line 86 is developed in switch threshold logic block 28 and input to switch block 30. Output line 22 from digital to analog converter 20 and output line 26 from digital to analog converter 24 are also input to switch block 30. Output on line 31 comes from either line 22 or line 26 by switching from one terminal to the other as schematically illustrated in the figure.

Clock steering logic 92 is a straight forward logical implementation for switching encoder and decoder clock pulses between dynamic storage devices 12 and 16. Q and $\overline{Q}$ outputs from clock switch toggle 32 are used as gating signals to apply encoder and decoder clock pulses on lines 8 and 38, respectively to the appropriate one of storage devices 12 and 16. Q output from clock switch toggle 32 along with encoder clock pulses on line 8 are applied to AND gate 100. $\overline{Q}$ output from clock switch toggle 32 and decoder clock pulses on line 38 are applied to AND gate 102. Outputs from AND gates 100 and 102 are applied to OR gate 108. The output from OR gate 108 is applied to storage device 12 as well as to digital to analog converter 20. In a like manner, encoder clock pulses on line 8 and the $\overline{Q}$ output from clock switch toggle 32 are applied to AND gate 104. The Q output from clock switch toggle 32 is used to gate the decoder clock rate on line 38 through AND gate 106. Outputs from AND gates 104 and 106 are applied to OR gate 110. The output from OR gate 110 is applied to storage device 16 as well as digital to analog converter 24. Output of dynamic storage devices 12 and 16 on lines 22 and 26 is actually applied to a using device (not shown) over line 31.

Figure 2:
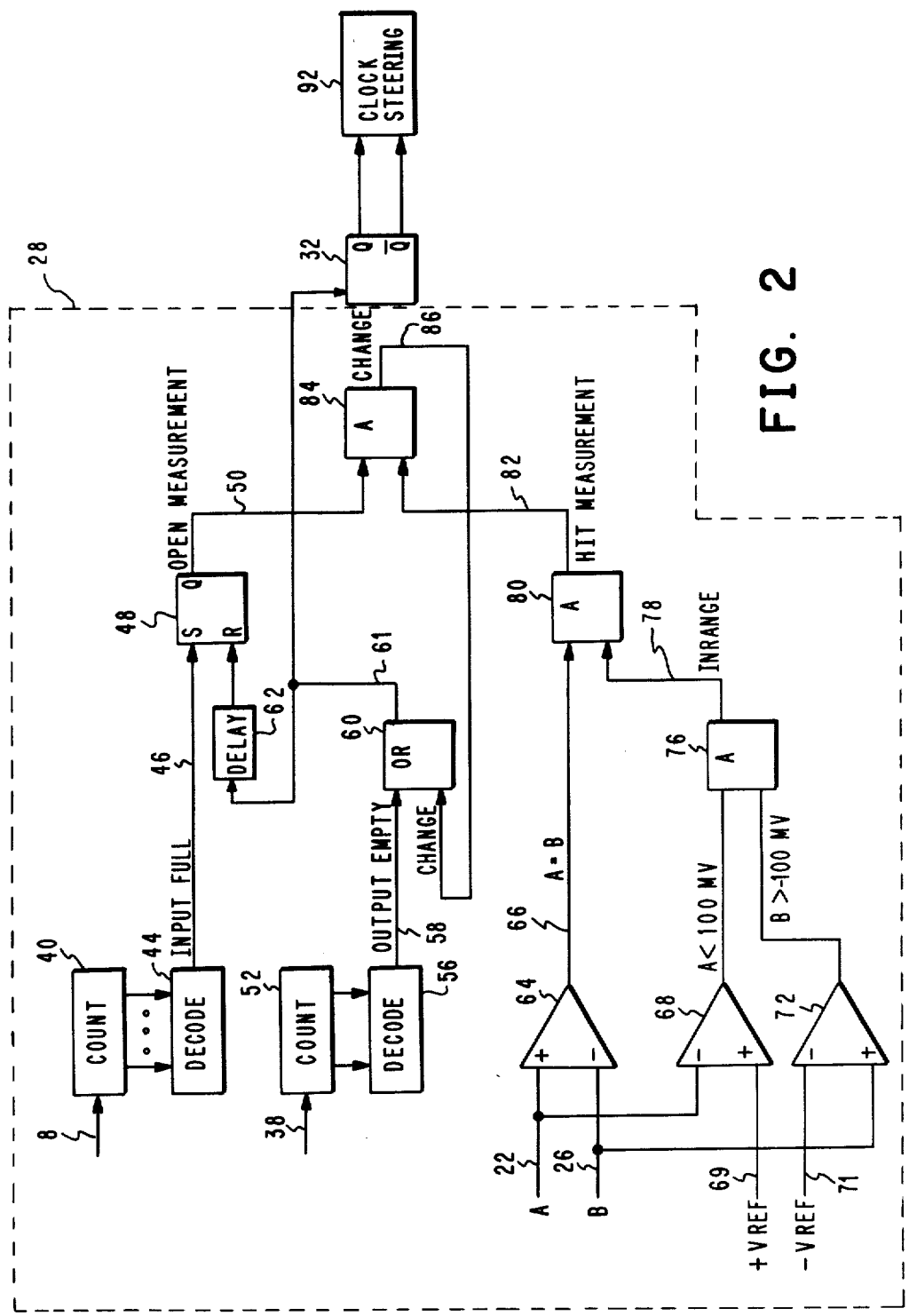
FIG. 2 is a more detailed diagram of the switch threshold logic block 28 of FIG. 1 and the control of clock switch logic block 32 of FIG. 1.

FIG. 2 is a more detailed diagram of switch threshold logic 28 and the control of clock switch toggle 32 shown in FIG. 1. Switch threshold logic 28 is associated with both dynamic storage devices 12 and 16 and receives the output from digital analog converters 20 and 24 on lines 22 and 26 as shown in FIG. 1. Switch threshold logic block 28 is operable to switch output over line 31 to a using device (not shown) via switch 30.

Pulses from the encoder clock on line 8 are input to counter 40 which is connected to decoder 44 for determining when the input storage device is full. That is, a comparison is made when the count in counter 40 is equal to the maximum capacity of either of the storage devices 12 and 16 of FIG. 1. The Input Full signal developed in decoder 44 is applied via line 46 to set latch 48 which when set applies the Open Measurement signal on line 50 to AND gate 84.

Decoder clock pulses on line 38 are input to counter 52 which is decoded by decoder 56 for determining when the output storage device is empty. That is, a comparison is made when the count in counter 52 is equal to the maximum capacity of either of the dynamic storage devices 12 and 16. The Output Empty signal from decoder 56 on line 58 is applied to OR gate 60. The output of OR gate 60 on line 61 passes through delay means 62, for reasons later to be described, and is the reset signal for latch 48. The just described apparatus is provided for causing encoder and decoder clock pulses on lines 8 and 38, respectively to be switched between dynamic storage devices 12 and 16 on default if during the search for "quiet switching time" switching has not occurred. That is, prior to the time whichever of dynamic storage devices 12 and 16 is supplying output to the using device has been completely dumped, the conditions of equal amplitude within a narrow zero-centered range of 100 mv have not been detected in the following manner.

Comparator 64 is provided for comparing analog output from digital to analog converters 20 and 24 on lines 22 and 26, respectively in FIG. 1. That is, the output voltage of the buffers A and B are compared. The output of comparator 64 on line 66 is at a positive level when the signals on lines 22 and 26 are equal meaning that the amplitudes of the output from buffers A and B are equal. This output on line 66 is applied as the first term to AND gate 80. Signals on lines 22 and 26 are also input to comparators 68 and 72, respectively. A positive reference voltage of 100 mv is applied to comparator 68 and a negative reference voltage of $-100$ mv is applied to comparator 72 on lines 69 and 71, respectively.

Outputs from comparators 68 and 72 are input to AND gate 76 to provide an indication that signals on lines 22 and 26 are within $\pm 100$ mv range. The Inrange output from AND gate 76 on line 78 is applied as the second term to AND gate 80. The output from AND gate 80 on line 82 indicates that the signals on lines 22 and 26 are both equal in amplitude and within the $\pm 100$ mv range; that is, a Hit has occurred. The Hit Output from AND gate 80 on line 82 is applied as the other input term to AND gate 84 which develops the Change Register signal on line 86.

The first term, the Open Measurement signal on line 50, applied to AND gate 84 signifies the beginning of the search for "quiet switching time". The second term of AND gate 84, the Hit signal on line 82 indicates that the "quiet switching time" has been found and AND gate 84 outputs the Change Register signal on line 86 now that the buffer not supplying output to the using device is full and the output voltage levels from both buffers A and B are of equal amplitude and within the $\pm 100$ mv range. It will be recalled from the description of FIG. 1 that the change register signal on line 86 is used to switch output to the using device over line 31 from a connection with either line 22 or line 26.

The Change Register signal on line 86 is applied to OR gate 60. The output from OR gate 60 on line 61 is applied to clock switch toggle 32 and delay 62. Delay 62 delays resetting latch 48, thus terminating Open Measurement, to assure that sufficient time has elapsed to allow clock switch toggle 32 to toggle.

Q output of toggle 32 causes through the control of clock steering 92 the first dynamic storage means 12 (buffer A) to receive input and second dynamic storage means 16 (buffer B) to output. $\overline{Q}$ output of toggle 32 causes just the opposite situation. Toggle 32 output, both Q and $\overline{Q}$, is applied to clock steering means 92 to accomplish switching of normal increased rate clock pulses.

Figure 3:
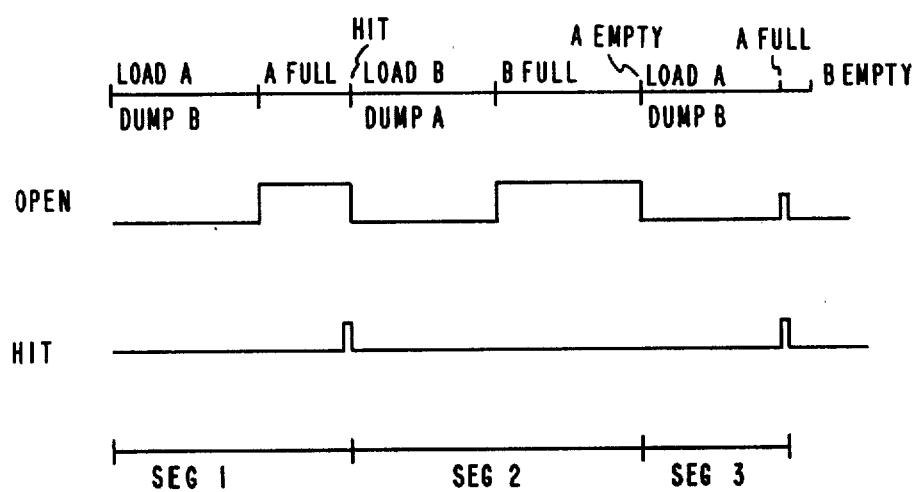
FIG. 3 is a timing diagram useful in describing the operation of the invention.

FIG. 3, a timing chart, is provided to illustrate situations which may occur in the operation of the present invention. In this example 2:1 compression is assumed; therefore, the maximum load time is one-half buffer length. It will be recalled that for convenience dynamic storage device 12 is designated buffer A and dynamic storage device 16 is designated buffer B.

The uppermost line of the timing chart depicts the times during which buffer A is loaded and buffer B is unloaded. It is to be noted that the load and dump times are exactly alike. When buffer A is full, the Open Measurement signal, the output of latch 48 comes up on line 50. Buffer A is however still being loaded with data. That is, the storage register is being overrun.

It will be recalled from the discussion of FIG. 2 that the Open Measurement signal on line 50, Q marks the beginning of the search for "quiet switching time". Open Measurement stays up until a "Hit" occurs. That is; when the signals on lines 22 and 26 are of equal amplitude and within the ±100 mv range as indicated by the output from AND gate 80 on line 82. At that time, Open Measurement goes down, and encoder and decoder clock pulses are switched, thus ending Segment 1.

Segment 2 begins with buffer B being loaded and buffer A being unloaded. When buffer B is full as indicated by the Input Full signal on line 46 Open Measurement comes up. The data is still being loaded into buffer B. In Segment 2, open Measurement stays up until buffer A is completely unloaded and the Output Empty signal on line 58 is developed. While the Open Measurement signal is up the search for "quiet switching time" occurs. It will be recalled that the apparatus of the instant invention provides for a default if the "quiet switching time" is not found. Segment 2 then is an example of the default since the Open Measurement signal goes down when the A buffer is empty rather than in response to a hit. A hit has not occurred because once buffer B became full the continuously monitored output voltage levels of buffers A and B at no time met the two conditions of being of equal amplitude and within the ±100 mv range.

Segment 3 starts with buffer A being loaded and buffer B being unloaded. Open Measurement begins when the input buffer A becomes full and ends when a Hit occurs. In this example the search for "quiet switching time" is short and terminates before buffer B is empty. Thus, variable length output segments occur because the switching of encoder and decoder clocks that determines the beginning of a new segment occurs as a function of when the two above described conditions are met. The Hit may occur at any time after the input buffer is full.

While our invention has been described using digital storage means and associated analog to digital and digital to analog converters, it is not limited thereto. It could be implemented using analog shift registers, thereby eliminating the requirement of analog to digital and digital analog converters as herein described.

While the invention has been particularly shown and described with reference to a preferred embodiment thereof, it will be understood by those skilled in the art that the foregoing and other changes in form and detail may be made without departing from the spirit and scope of the invention.

What is claimed is:

1. In a system for time compression of prerecorded speech signals which are played back at a rate greater than that at which they were recorded and in which the input speech is loaded alternately into first and second buffers and output from the buffers is alternatively applied to a using device, said system including
    means for loading one of said buffers while the other is providing an output to said using device, the improvement comprising:
    means for changing the source of output applied to said using device from said first buffer to said second buffer when the output level of both of said buffers falls within a predetermined range.

2. The system of claim 1 wherein the means for the source of output further includes means for determining when the output level of both of said buffers is substantially equal.

3. The system of claim 1 wherein said output levels of said buffers move about a zero reference and wherein the predetermined range has its midpoint at substantially the zero level.

4. The speech system of claim 3 further wherein the width of said range is less than two percent of the maximum amplitude of said output levels.

5. The speech system of claim 4 wherein the output from said first buffer to said using device is terminated when said first buffer is empty and the output of said second buffer is then applied to said using device.

6. Apparatus for time compressing speech signals which includes an input terminal for receiving the speech signals, an analog to digital converter connected to the input terminal, first and second dynamic storage means connected to the analog to digital converter, means for reading the signals into either the first or second storage means at a first rate, means for reading out from either the first or second storage means at a second rate, first and second digital to analog converters connected to the outputs of the first and second storage means, means for comparing the outputs of the first and second digital to analog converters, the improvement comprising:
    means responsive to said means for comparing for alternating reading in and reading out when the output of said digital to analog converters is within a certain predetermined range, whereby segments of speech signals from said first and second dynamic storage means are joined with a minimum of generated noise.

7. The apparatus of claim 6 wherein the means for comparing the outputs of said first and second digital to analog converters includes first comparator means for determining equality of the outputs of said digital to analog converters, second comparator means for determining if the output of one of said digital to analog converters is less than a predetermined reference value, third comparator means for determining whether the output from said second digital to analog converter is greater than a second predetermined reference value, and means responsive to said first, second and third comparator means for developing a change signal when the outputs from said first and second digital analog converters are equal and within the predetermined range.

8. The apparatus of claim 7 wherein said first and second reference values define a narrow window with zero at its center.

9. A method of joining time compressed recorded speech signals in a substantially noise free manner comprising the steps of:

sampling speech signals;

storing said sampled signals at a first rate in one of a pair of storage elements;

reading out said sampled speech signals at a second rate from the other of the pair of storage elements;

continually comparing output voltages from each storage element;

switching input and output clocks applied to the storage elements when the voltage levels from each storage device are substantially equal and within a predetermined range of a zero crossing; and switching from one to the other of the storage elements as the source of output applied to a using device.

* * * * *